United States Patent
Naganuma et al.

Patent Number: 5,388,003
Date of Patent: Feb. 7, 1995

[54] PROJECTION LENS SYSTEM

[75] Inventors: Kazuhiro Naganuma, Tokyo; Yasunori Arai, Saitama, both of Japan

[73] Assignee: Asahi Kogaku Kogyo Kabushiki Kaisha, Tokyo, Japan

[21] Appl. No.: 242,063

[22] Filed: May 13, 1994

Related U.S. Application Data

[63] Continuation of Ser. No. 968,483, Oct. 29, 1992, abandoned.

[30] Foreign Application Priority Data

Oct. 29, 1991 [JP] Japan .................. 3-347594
Oct. 29, 1991 [JP] Japan .................. 3-347595

[51] Int. Cl.$^6$ ............................. G02B 9/62
[52] U.S. Cl. .................... 359/649; 359/758; 359/760
[58] Field of Search ............... 359/758, 760, 649

[56] References Cited

U.S. PATENT DOCUMENTS 3,121,135  2/1964  Altman et al. .............. 359/760
3,922,071 11/1975  Kitagawa et al. .
4,269,477  5/1981  Kitagawa .
4,560,243 12/1985  Terasawa .

FOREIGN PATENT DOCUMENTS 2803300 11/1978 Germany .
2828435 12/1978 Germany .

Primary Examiner—Edward K. Look
Assistant Examiner—Christopher Verdier
Attorney, Agent, or Firm—Sughrue, Mion, Zinn, Macpeak & Seas

[57] ABSTRACT

A projection lens system which produces a smaller amount of residual chromatic aberrations and which will exhibit satisfactory performance even if it is used as a long-focus lens. The projection lens system is composed of a front group and a rear group. The front group includes, in order from the object side, a positive first lens element, a positive second lens element and a negative third lens element. The lens system satisfies the following conditions:

$$-0.0015 < (\theta 2 - \theta 3)/(\nu 2 - \nu 3) < 0$$

where $\theta 2$ and $\nu 2$ denote the dispersion index of the second lens element and $\theta 3$ and $\nu 3$ denote the dispersion index of the third lens element, with $\theta$ and $\nu$ being defined by:

$$\theta = (n g - n F)/(n F - n C)$$

$$\nu = (n d - 1)/(n F - n C)$$

where $ng$, $nF$, $nC$ and $nd$ denote the refractive indices of a lens element at the g, F, C and d lines, respectively.

6 Claims, 11 Drawing Sheets

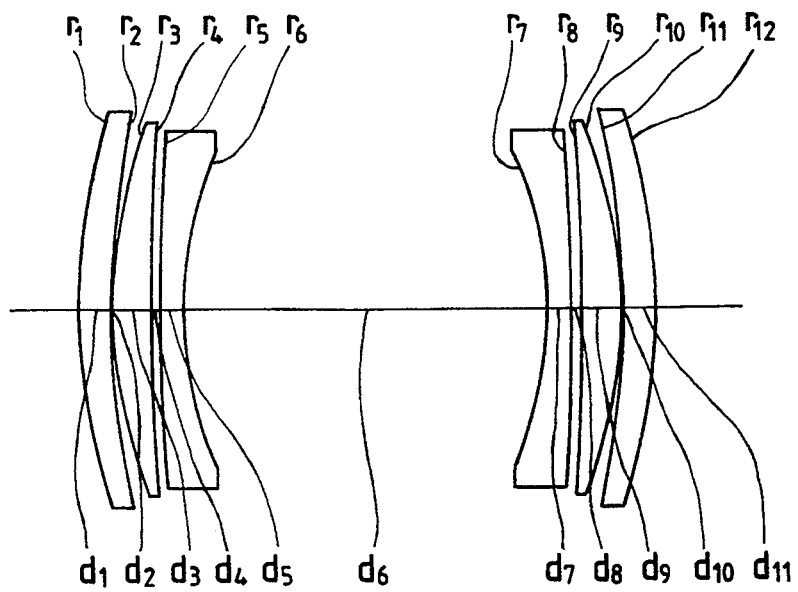
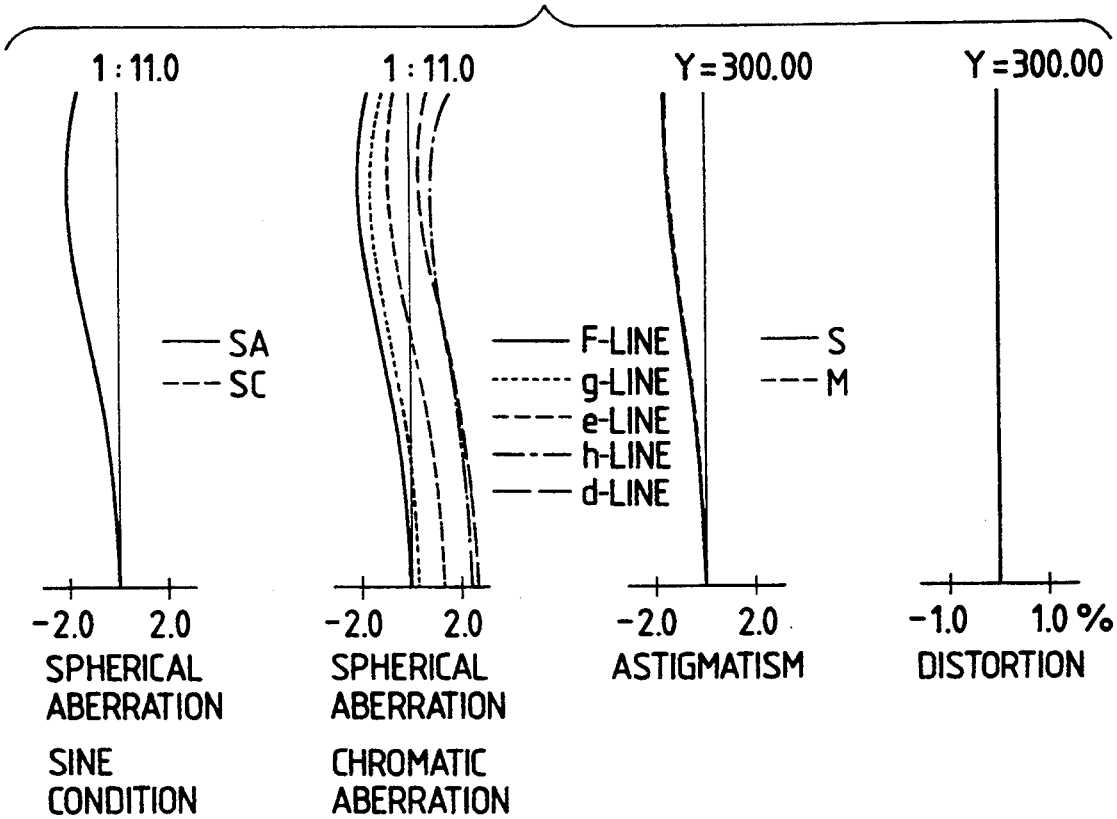

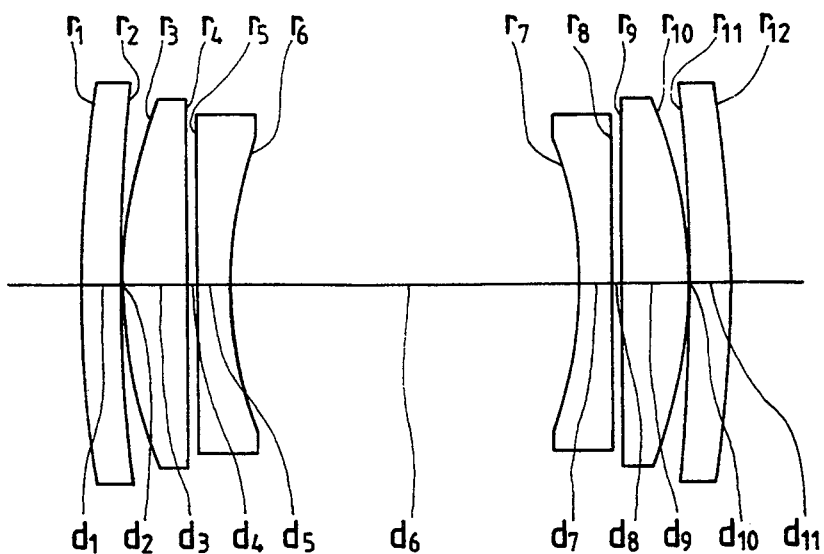
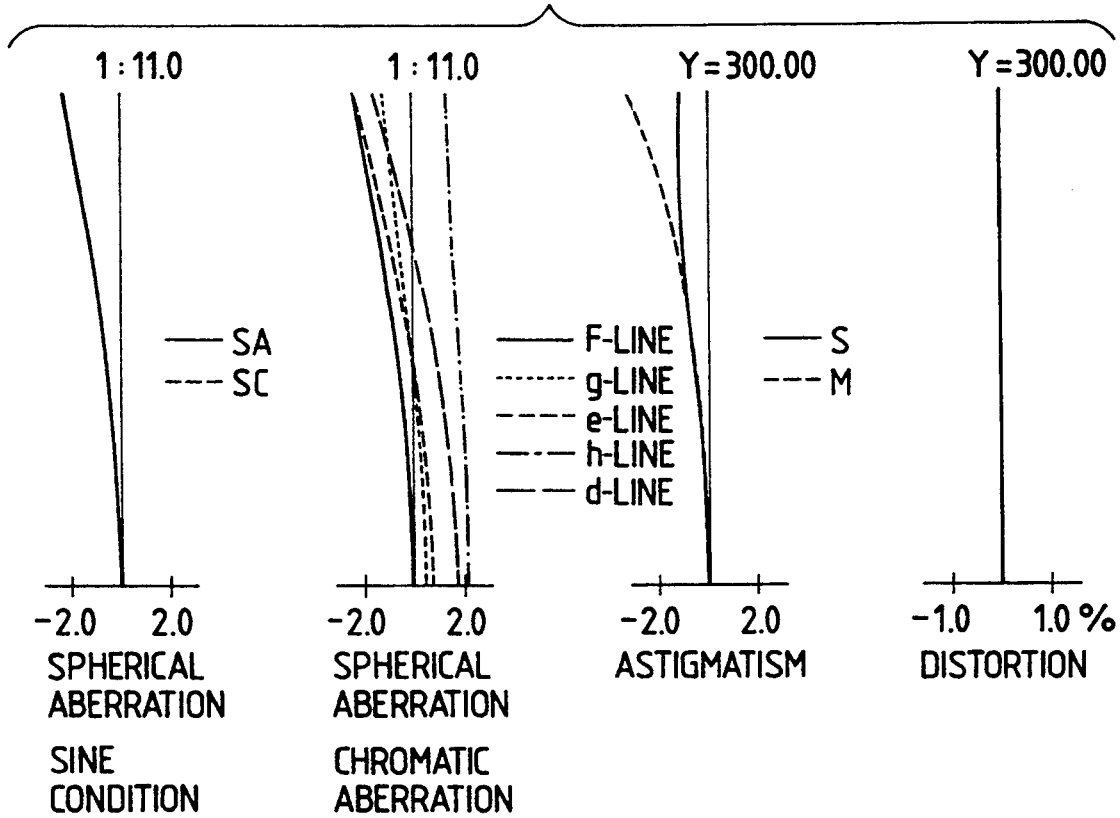

PROJECTION LENS SYSTEM

This is a continuation of application Ser. No. 07/968,483 filed Oct. 29, 1992 now abandoned.

BACKGROUND OF THE INVENTION

This application is based on and claims priorities from Japanese Patent Applications No. Hei-3-347594 and No. 3-347595 both filed Oct. 29, 1991.

The present invention relates to a projection lens system that is principally intended to be used in platemaking to project and duplicate patterns.

A known platemaking projection lens system of the type contemplated by the present invention is described in Japanese Patent Publication No. Sho 56-53728. The projection lens system disclosed in the publication exhibits satisfactory imaging performance at life size and at magnifications in its neighborhood and features a compact lens geometry.

However, the prior art projection lens system described above has the problem that chromatic aberrations are not completely corrected and that if it is used as a long-focus lens, a drop in contrast occurs to make it impossible to insure satisfactory performance.

The present invention has been accomplished in the light of these problems of the prior art and has as an object providing a projection lens system that is designed to produce a smaller amount of residual chromatic aberrations and which, hence, will exhibit satisfactory performance even if it is used as a long-focus lens.

SUMMARY OF THE INVENTION

The above-stated and other objects of the present invention can be attained by a projection lens system that is composed of a front group and a rear group, the front group comprising, in order from the object side, a positive first lens element, a positive second lens element and a negative third lens element, the rear group comprising a negative fourth lens element, a positive fifth lens element and a positive sixth lens element, the lens system satisfying the following conditions:

$$-0.0015 < (\theta 2 - \theta 3)/(\nu 2 - \nu 3) < 0 \quad (1)$$

$$-0.0015 < (\theta 5 - \theta 4)/(\nu 5 - \nu 4) < 0 \quad (1')$$

where $\theta 2$ and $\nu 2$ denote the dispersion index of the second lens element, $\theta 3$ and $\nu 3$ denote the dispersion index of the third lens element, $\theta 4$ and $\nu 4$ denote the dispersion index of the fourth lens element and $\theta 5$ and $\nu 5$ denote the dispersion index of the fifth lens element and, with $\theta$ and $\nu$ being defined by:

$$\theta = (ng - nF)/(nF - nC)$$

$$\nu = (nd - 1)/(nF - nC)$$

where ng, nF, nC and nd denote the refractive indices of a lens element at the g, F, C and d lines, respectively.

According to another aspect of the invention, there is provided a projection lens system that is composed of a front group and a rear group, the front group comprising, in order from the object side, a positive first lens element, a negative second lens element and a positive third lens element, the rear group comprising a positive fourth lens element, a negative fifth lens element and a positive sixth lens element, the lens system satisfying the following conditions:

$$-0.0012 < (\theta 1 - \theta 2)/(\nu 1 - \nu 2) < 0 \quad (1A)$$

$$-0.0012 < (\theta 6 - \theta 5)/(\nu 6 - \nu 5) < 0 \quad (1A')$$

where $\theta 1$ and $\nu 1$ denote the dispersion index of the first lens element, $\theta 2$ and $\nu 2$ denote the dispersion index of the second lens element, $\theta 5$ and $\nu 5$ denote the dispersion index of the fifth lens element and $\theta 6$ and $\nu 6$ denote the dispersion index of the sixth lens element, with $\theta$ and $\theta$ and $\nu$ being defined by:

$$\theta = (ng - nF)/(nF - nC)$$

$$\nu = (nd - 1)/(nF - nC).$$

where ng, nF, nC and nd denote the refractive indices of a lens element at the g, F, C and d lines, respectively.

BRIEF DESCRIPTION OF THE DRAWINGS

In the accompanying drawings:

FIG. 1 is a simplified cross-sectional view showing the projection lens system of Example 1;

FIG. 2 is a set of graphs plotting the aberration curves obtained with the projection lens system of Example 1;

FIG. 13 is a simplified cross-sectional view showing the projection lens system of Example 7;

FIG. 14 is a set of graphs plotting the aberration curves obtained with the projection lens system of Example 7;

DESCRIPTION OF THE PREFERRED EMBODIMENTS

Figure 3:
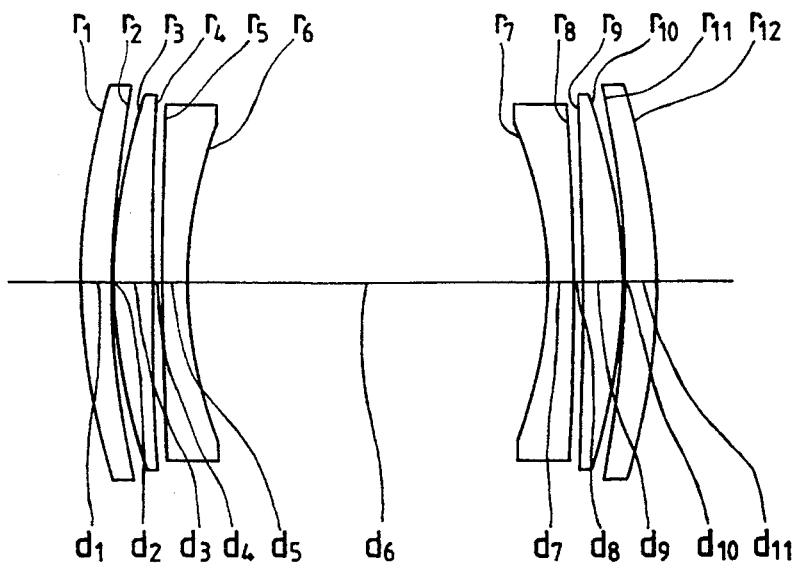
FIG. 3 is a simplified cross-sectional view showing the projection lens system of Example 2.

Examples of the projection lens system of the present invention are described below.

As typically shown in FIG. 1, each of the lens systems according to the examples is composed of 6 elements as divided between a front group and a rear group, the front group comprising, in order from the object side, a positive first lens element, a positive second lens element and a negative third lens element, the rear group comprising a negative fourth lens element, a positive fifth lens element and a positive sixth lens element, and each lens system satisfies the conditions (1) and (1') set forth above. If this condition is satisfied, residual aberration can be suppressed to a sufficiently low level to produce a sharp image.

In order to insure flatness for the image plane, the projection lens system of the present invention desirably satisfies the following conditions:

$$0.25 < f2/f < 0.40 \quad (2)$$

$$0.25 < f5/f < 0.40 \quad (2')$$

$$-0.30 < f3/f < -0.20 \quad (3)$$

$$-0.30 < f4/f < -0.20 \quad (3')$$

$$0.03 < (nF1+nF2)/2 - nF3 \quad (4)$$

$$0.03 < (nF6+nF5)/2 - nF4 \quad (4')$$

$$0.15 < L/f < 0.25 \quad (5)$$

where f denotes the focal length of the overall system, fi the focal length of the ith lens element, nFi the refractive index of the ith lens element at the F-line, and L the overall lens length.

Conditions (2), (2'), (3) and (3') specify the distribution of power between the second and third lens elements and fourth and fifth lens elements, respectively. If the upper limit of either condition is exceeded, the spherical aberration and curvature of the field that develop will be overcorrected. If the lower limit of neither condition is reached, the two kinds of aberration will be undercorrected.

Condition (4) and (4') specify the Petzval sum. If these conditions are not met, the Petzval sum increases to cause greater curvature of the field and astigmatism.

Condition (5) specifies the overall lens length. If the upper limit of this condition is exceeded, the overall lens length becomes excessive. If the lower limit of this condition is not reached, the field curvature will increase.

If conditions (2) to (5) and (2') to (4') are satisfied, the flatness of the image plane is insured and within a half-view angle range of 12°, a uniform and high resolution can be attained to produce an image having no unevenness in density.

Further, in order to suppress spherical aberration and field curvature, the projection lens system of the present invention desirably satisfies the following conditions:

$$3.5 < f \cdot \{(nF3-1)/r6\} < 5.5 \quad (6)$$

$$3.5 < f \cdot \{(nF4-1)/r7\} < 5.5 \quad (6')$$

$$5.0 < f \cdot \{(nF1-1)/r1 + (nF2-1)/r3\} < 10.0 \quad (7)$$

$$5.0 < f \cdot \{(nF6-1)/r12 + (nF5-1)/r10\} < 10.0 \quad (7')$$

$$0.07 < d6/f < 0.15 \quad (8)$$

where ri denotes the radius of curvature of the ith surface as counted from the object side, and d6 the space between the front and rear groups.

Conditions (6), (6'), (7) and (7') specify the balance between refractive index and curvature radius for various lens elements. If the upper limit of conditions (6) and (6') is exceeded, the spherical aberration and curvature of the field that develop will be overcorrected. If the lower limit of these conditions is not reached, those kinds of aberration will be undercorrected. If the upper limit of conditions (7) and (7') is exceeded, the spherical aberration and curvature of the field that develop will be undercorrected. If the lower limit of these conditions is not reached, those kinds of aberration will be overcorrected.

Condition (8) specifies the space between the front and rear groups. If the upper limit of this condition is exceeded, not only is curvature of the field undercorrected but also the overall lens length will increase. If the lower limit of condition (8) is not reached, curvature of the field will be overcorrected.

Figure 15:
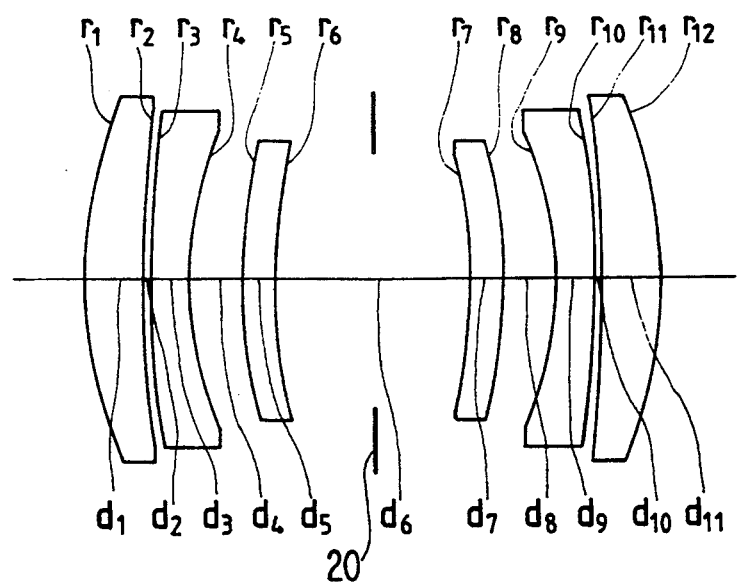
FIG. 15 is a simplified cross-sectional view showing the projection lens system of Example 8.

As typically shown in FIG. 15, according to another aspect of the invention, each of the lens systems according to the examples is composed of 6 elements as divided between a front group and a rear group, the front group comprising, in order from the object side, a positive first lens element a negative second lens element and a positive third lens element, the rear group comprising a positive fourth lens element, a negative fifth lens element and a positive sixth lens element, the rear group being located completely symmetrical to the front group with respect to a stop diaphragm, and each lens system satisfies the conditions (1A) and (1A') set forth above. If this condition is satisfied, residual aberration can be suppressed to a sufficiently low level to produce a sharp image.

In order to insure flatness for the image plane, the projection lens system of the present invention desirably satisfies the following conditions:

$$0.25 < f1/f < 0.40 \quad (2A)$$

$$0.25 < f6/f < 0.40 \quad (2A')$$

$$-0.40 < f2/f < -0.30 \quad (3A)$$

$$-0.40 < f5/f < -0.30 \quad (3A')$$

$$0.04 < (nF1+nF3)/2 - nF2 \quad (4A)$$

$$0.04 < (nF6+nF4)/2 - nF5 \quad (4A')$$

$$0.15 < L/f < 0.25 \quad (5)$$

Conditions (2A), (2A'), (3A) and (3A') specify the distribution of power between the second and third lens elements and fourth and fifth lens elements, respectively. If the upper limit of either condition is exceeded, the spherical aberration and curvature of the field that develop will be overcorrected. If the lower limit of neither condition is reached, the two kinds of aberration will be undercorrected.

Condition (4A) and (4A') specify the Petzval sum. If these conditions are not met, the Petzval sum increases to cause greater curvature of the field and astigmatism.

If conditions (2A) to (5) and (2A') to (4A') are satisfied, the flatness of the image plane is insured and within a half-view angle range of 12°, a uniform and high resolution can be attained to produce an image having no unevenness in density.

Further, in order to suppress spherical aberration and field curvature, the projection lens system of the present invention desirably satisfies the following conditions:

$$3.5 < f \cdot \{(nF2-1)/r4\} < 5.5 \quad (6A)$$

$$3.5 < |f \cdot \{(nF5-1)/r9\}| < 5.5 \quad (6A')$$

$$7.0 < f \cdot \{(nF1-1)/r1 + (nF3-1)/r5\} < 10.0 \quad (7A)$$

$$7.0 < |f \cdot \{(nF6-1)/r12 + (nF4-1)/r8\}| < 10.0 \quad (7A')$$

$$0.05 < d6/f < 0.09 \quad (8A)$$

where ri denotes the radius of curvature of the ith surface as counted from the object side, and d6 the space between the front and rear groups.

Conditions (6A), (6A'), (7A) and (7A') specify the balance between refractive index and curvature radius for various lens elements. If the upper limit of conditions (6A) and (6A') is exceeded, the spherical aberration and curvature of the field that develop will be overcorrected. If the lower limit of these conditions is not reached, those kinds of aberration will be undercorrected. If the upper limit of conditions (7A) and (7A') is exceeded, the spherical aberration and curvature of the field that develop will be undercorrected. If the lower limit of these conditions is not reached, those kinds of aberration will be overcorrected.

Condition (8A) specifies the space between the front and rear groups. If the upper limit of this condition is exceeded, not only is curvature of the field undercorrected but also the overall lens length will increase. If the lower limit of condition (8A) is not reached, curvature of the field will be overcorrected.

EXAMPLE 1

FIG. 1 is a simplified cross-sectional view showing a projection lens system according to Example 1 of the present invention. Specific data for this example are shown in Table 1, in which f denotes the focal length at the F line (486 nm), m the magnification, fB the back focus, FNo. the F number, r the radius of curvature, d the lens thickness or airspace, nF, ng, nC and nd the refractive indices at the F, g, C and d lines, respectively, and $\nu$ the Abbe number.

FIG. 2 is a set of graphs plotting the curves of various aberrations as obtained with the projection lens system of Example 1, i.e., spherical aberration SA, sine condition SC, chromatic aberrations as represented by spherical aberrations at the F, g, e, h and d lines, astigmatism (S, sagittal; M, meridional), and distortion.

TABLE 1

| Surface No. | r | d | nF | $\nu$ | ng | nC | nd |
|---|---|---|---|---|---|---|---|
| \multicolumn{8}{c}{f = 599.00  m = −1.00  fB = 1134.91  FNo. 1:11} |
| 1 | 126.935 | 6.50 | 1.81994 | 40.9 | 1.83115 | 1.80025 | 1.80610 |
| 2 | 168.626 | 0.50 | | | | | |
| 3 | 100.408 | 8.00 | 1.62757 | 60.3 | 1.63316 | 1.61728 | 1.62041 |
| 4 | 587.154 | 1.87 | | | | | |
| 5 | 496.672 | 5.00 | 1.62310 | 44.2 | 1.63089 | 1.60924 | 1.61340 |
| 6 | 80.121 | 74.27 | | | | | |
| 7 | −80.121 | 5.00 | 1.62310 | 44.2 | 1.63089 | 1.60924 | 1.61340 |
| 8 | −496.672 | 1.87 | | | | | |
| 9 | −587.154 | 8.00 | 1.62757 | 60.3 | 1.63316 | 1.61728 | 1.62041 |
| 10 | −100.408 | 0.50 | | | | | |
| 11 | −168.626 | 6.50 | 1.81994 | 40.9 | 1.83115 | 1.80025 | 1.80610 |
| 12 | −126.935 | | | | | | |

EXAMPLE 2

Figure 4:
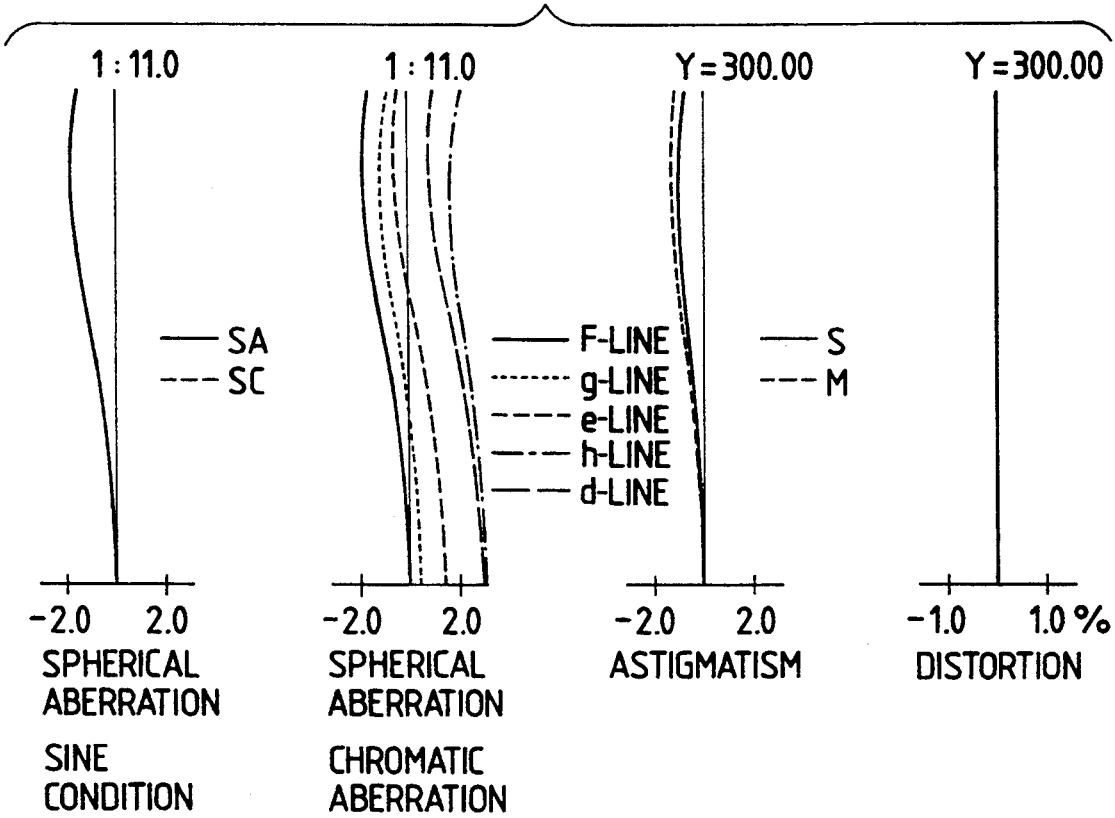
FIG. 4 is a set of graphs plotting the aberration curves obtained with the projection lens system of Example 2.

FIG. 3 is a simplified cross-sectional view showing a projection lens system according to Example 2 of the present invention. Specific data for this example are shown in Table 2. FIG. 4 is a set of graphs plotting the aberration curves obtained with the projection lens system of Example 2.

TABLE 2

| Surface No. | r | d | nF | $\nu$ | ng | nC | nd |
|---|---|---|---|---|---|---|---|
| \multicolumn{8}{c}{f = 599.00  m = −1.00  fB = 1135.22  FNo. 1:11} |
| 1 | 127.368 | 6.50 | 1.84852 | 42.7 | 1.85953 | 1.82898 | 1.83481 |
| 2 | 178.260 | 0.50 | | | | | |
| 3 | 112.883 | 8.00 | 1.62757 | 60.3 | 1.63316 | 1.61728 | 1.62041 |
| 4 | 861.149 | 1.98 | | | | | |
| 5 | 765.130 | 5.00 | 1.62310 | 44.2 | 1.63089 | 1.60924 | 1.61340 |
| 6 | 85.937 | 74.03 | | | | | |
| 7 | −85.937 | 5.00 | 1.62310 | 44.2 | 1.63089 | 1.60924 | 1.61340 |
| 8 | −765.130 | 1.98 | | | | | |
| 9 | −861.149 | 8.00 | 1.62757 | 60.3 | 1.63316 | 1.61728 | 1.62041 |
| 10 | −112.883 | 0.50 | | | | | |
| 11 | −178.260 | 6.50 | 1.84852 | 42.7 | 1.85953 | 1.82898 | 1.83481 |
| 12 | −127.368 | | | | | | |

EXAMPLE 3

Figure 5:
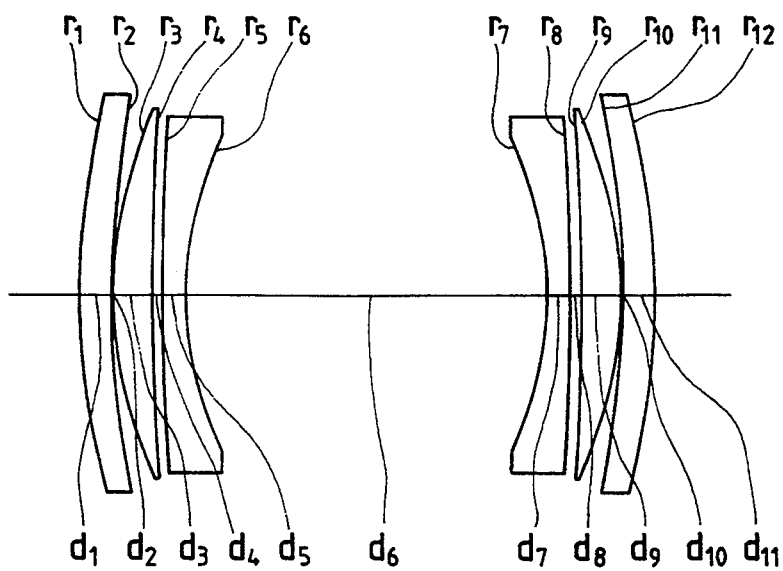
FIG. 5 is simplified cross-sectional view showing the projection lens system of Example 3.
Figure 6:
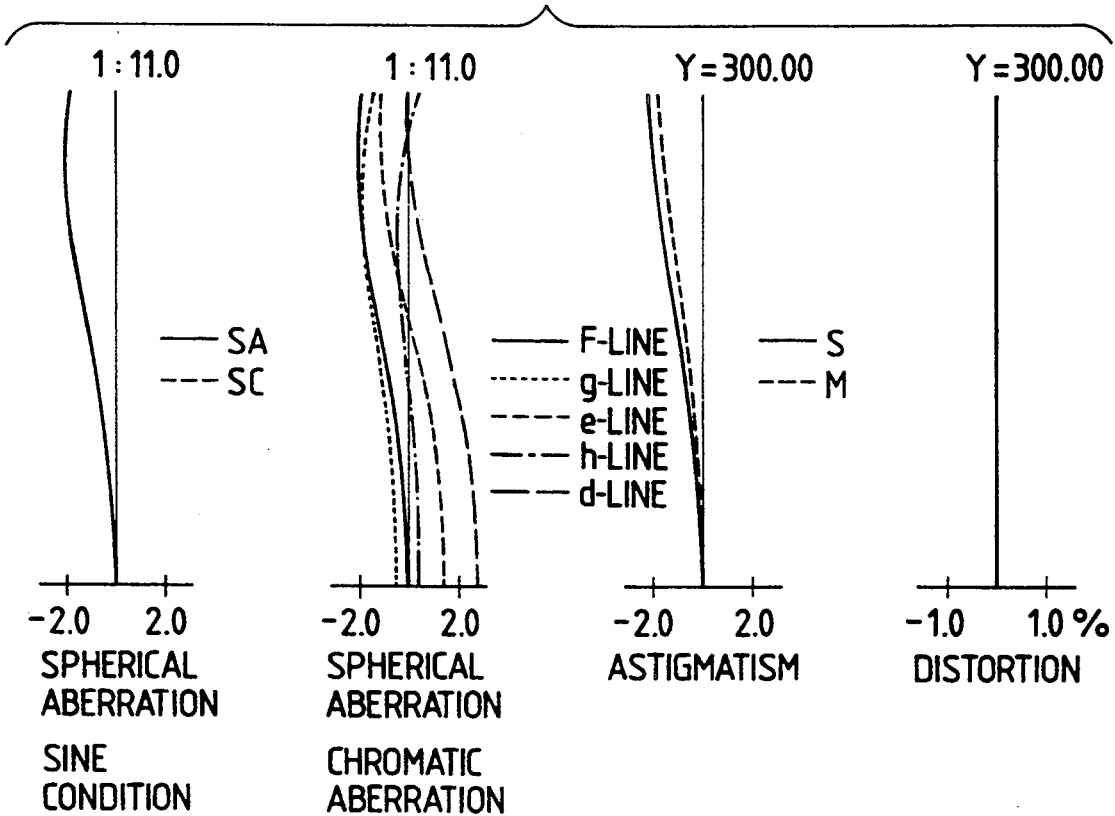
FIG. 6 is a set of graphs plotting the aberration curves obtained with the projection lens system of Example 3.

FIG. 5 is a simplified cross-sectional view showing a projection lens system according to Example 3 of the present invention. Specific data for this example are shown in Table 3. FIG. 6 is a set of graphs plotting the aberration curves obtained with the projection lens system of Example 3.

TABLE 3

| Surface No. | r | d | nF | $\nu$ | ng | nC | nd |
|---|---|---|---|---|---|---|---|
| \multicolumn{8}{c}{f = 599.06  m = −1.00  fB = 1135.07  FNo. 1:11} |
| 1 | 153.183 | 6.50 | 1.81719 | 35.0 | 1.83061 | 1.79428 | 1.80100 |
| 2 | 197.561 | 0.50 | | | | | |
| 3 | 88.274 | 8.00 | 1.62757 | 60.3 | 1.63316 | 1.61728 | 1.62041 |
| 4 | 567.520 | 1.89 | | | | | |
| 5 | 490.298 | 5.00 | 1.62310 | 44.2 | 1.63089 | 1.60924 | 1.61340 |
| 6 | 75.615 | 74.22 | | | | | |
| 7 | −75.615 | 5.00 | 1.62310 | 44.2 | 1.63089 | 1.60924 | 1.61340 |
| 8 | −490.298 | 1.89 | | | | | |
| 9 | −567.520 | 8.00 | 1.62757 | 60.3 | 1.63316 | 1.61728 | 1.62041 |
| 10 | −88.274 | 0.50 | | | | | |
| 11 | −197.561 | 6.50 | 1.81719 | 35.0 | 1.83061 | 1.79428 | 1.80100 |
| 12 | −153.183 | | | | | | |

EXAMPLE 4

Figure 7:
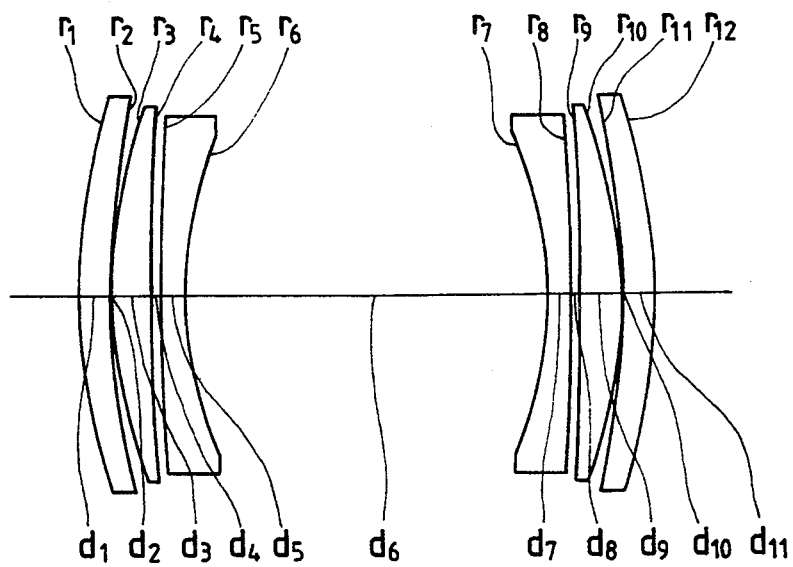
FIG. 7 is a simplified cross-sectional view showing the projection lens system of Example 4.
Figure 8:
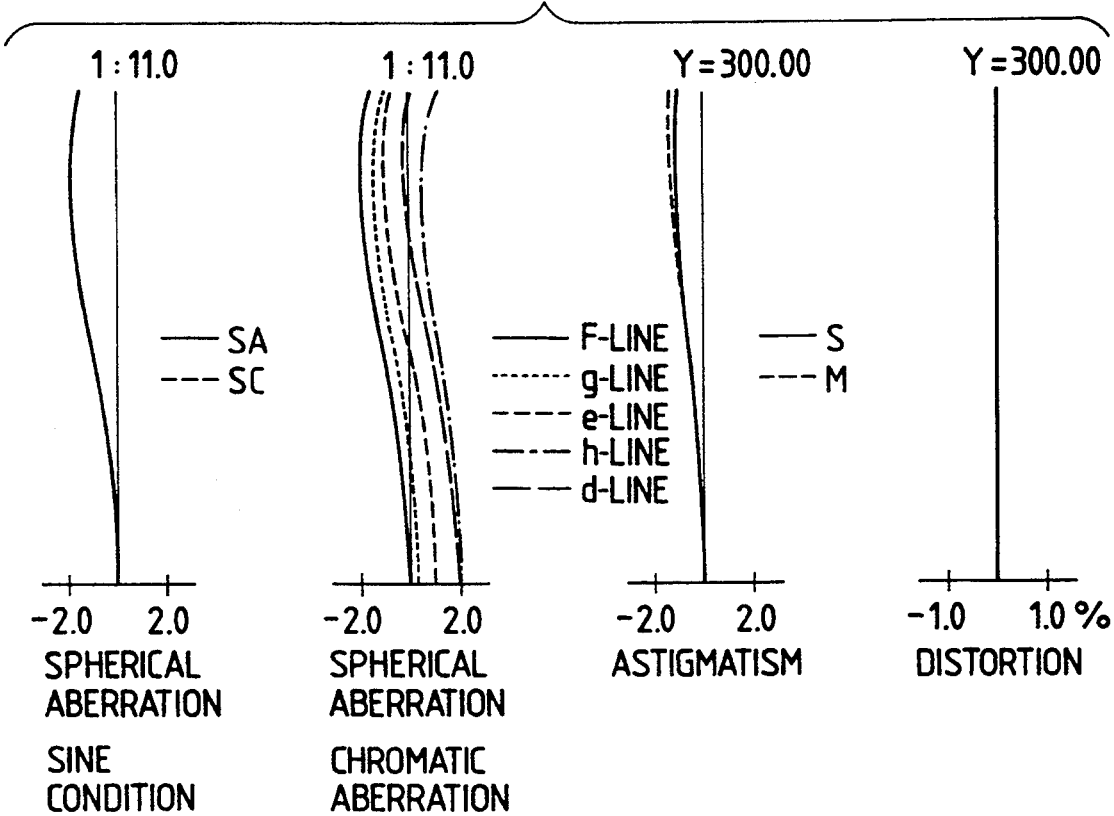
FIG. 8 is a set of graphs plotting the aberration curves obtained with the projection lens system of Example 4.

FIG. 7 is a simplified cross-sectional view showing a projection lens system according to Example 4 of the present invention. Specific data for this example are shown in Table 4. FIG. 8 is a set of graphs plotting the aberration curves obtained with the projection lens system of Example 4.

TABLE 4 f = 599.00   m = −1.00   fB = 1134.85   FNo. 1:11

| Surface No. | r | d | nF | ν | ng | nC | nd |
|---|---|---|---|---|---|---|---|
| 1 | 121.726 | 6.50 | 1.81994 | 40.9 | 1.83115 | 1.80025 | 1.80610 |
| 2 | 168.872 | 0.50 | | | | | |
| 3 | 107.003 | 8.00 | 1.62383 | 62.8 | 1.62917 | 1.61401 | 1.61700 |
| 4 | 620.006 | 1.89 | | | | | |
| 5 | 529.711 | 5.00 | 1.62310 | 44.2 | 1.63089 | 1.60924 | 1.61340 |
| 6 | 81.771 | 74.23 | | | | | |
| 7 | −81.771 | 5.00 | 1.62310 | 44.2 | 1.63089 | 1.60924 | 1.61340 |
| 8 | −529.711 | 1.89 | | | | | |
| 9 | −620.006 | 8.00 | 1.62383 | 62.8 | 1.62917 | 1.61401 | 1.61700 |
| 10 | −107.003 | 0.50 | | | | | |
| 11 | −168.872 | 6.50 | 1.81994 | 40.9 | 1.83115 | 1.80025 | 1.80610 |
| 12 | −121.726 | | | | | | |

EXAMPLE 5

Figure 9:
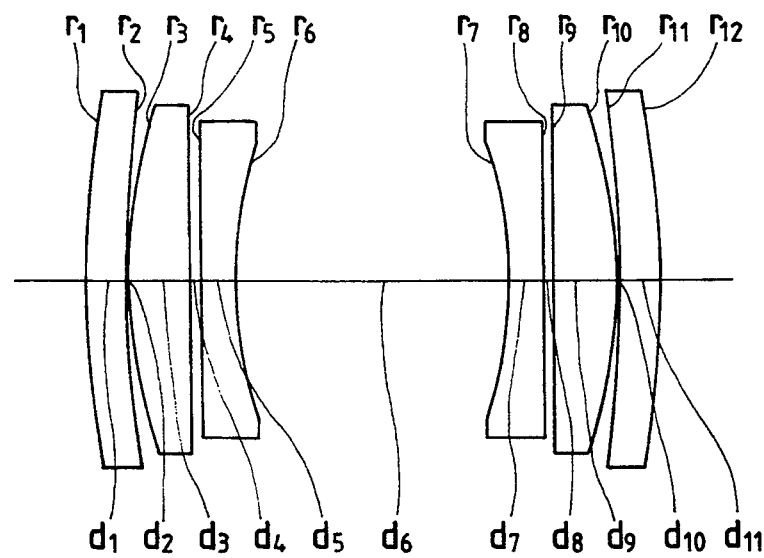
FIG. 9 is a simplified cross-sectional view showing the projection lens system of Example 5.
Figure 10:
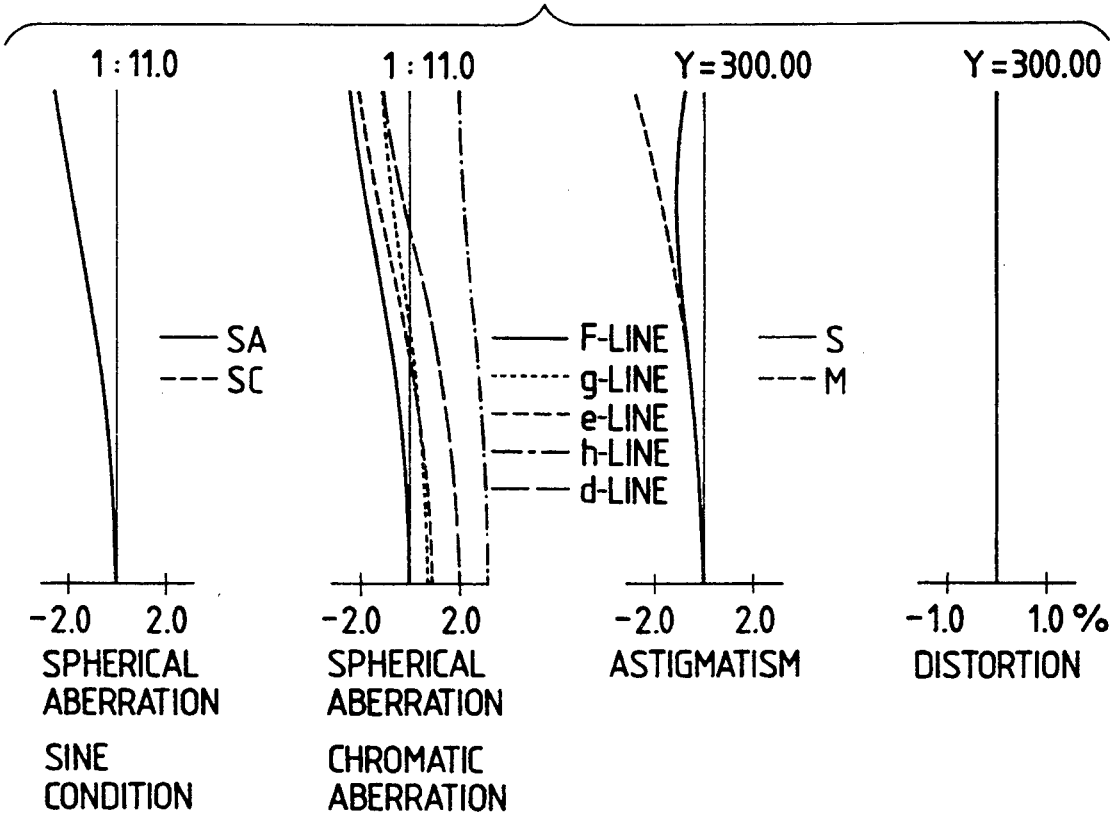
FIG. 10 is a set of graphs plotting the aberration curves obtained with the projection lens system of Example 5.

FIG. 9 is a simplified cross-sectional view showing a projection lens system according to Example 5 of the present invention. Specific data for this example are shown in Table 5. FIG. 10 is a set of graphs plotting the aberration curves obtained with the projection lens system of Example 5.

TABLE 5 f = 598.77   m = −1.00   fB = 1138.52   FNo. 1:11

| Surface No. | r | d | nF | ν | ng | nC | nd |
|---|---|---|---|---|---|---|---|
| 1 | 195.000 | 8.50 | 1.84982 | 37.2 | 1.86278 | 1.82738 | 1.83400 |
| 2 | 273.800 | 0.54 | | | | | |
| 3 | 111.252 | 13.00 | 1.62757 | 60.3 | 1.63316 | 1.61728 | 1.62041 |
| 4 | −4593.852 | 1.99 | | | | | |
| 5 | −13639.246 | 7.00 | 1.62310 | 44.2 | 1.63089 | 1.60924 | 1.61340 |
| 6 | 92.300 | 55.94 | | | | | |
| 7 | −92.300 | 7.00 | 1.62310 | 44.2 | 1.63089 | 1.60924 | 1.61340 |
| 8 | 13639.246 | 1.99 | | | | | |
| 9 | 4593.852 | 13.00 | 1.62757 | 60.3 | 1.63316 | 1.61720 | 1.62041 |
| 10 | −111.252 | 0.54 | | | | | |
| 11 | −273.800 | 8.50 | 1.84982 | 37.2 | 1.86278 | 1.82738 | 1.83400 |
| 12 | −195.000 | | | | | | |

EXAMPLE 6

Figure 11:
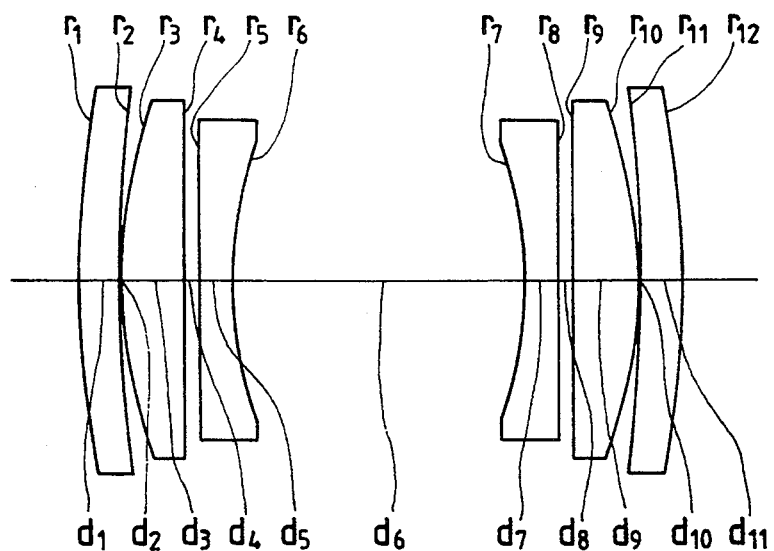
FIG. 11 is a simplified cross-sectional view showing the projection lens system of Example 6.
Figure 12:
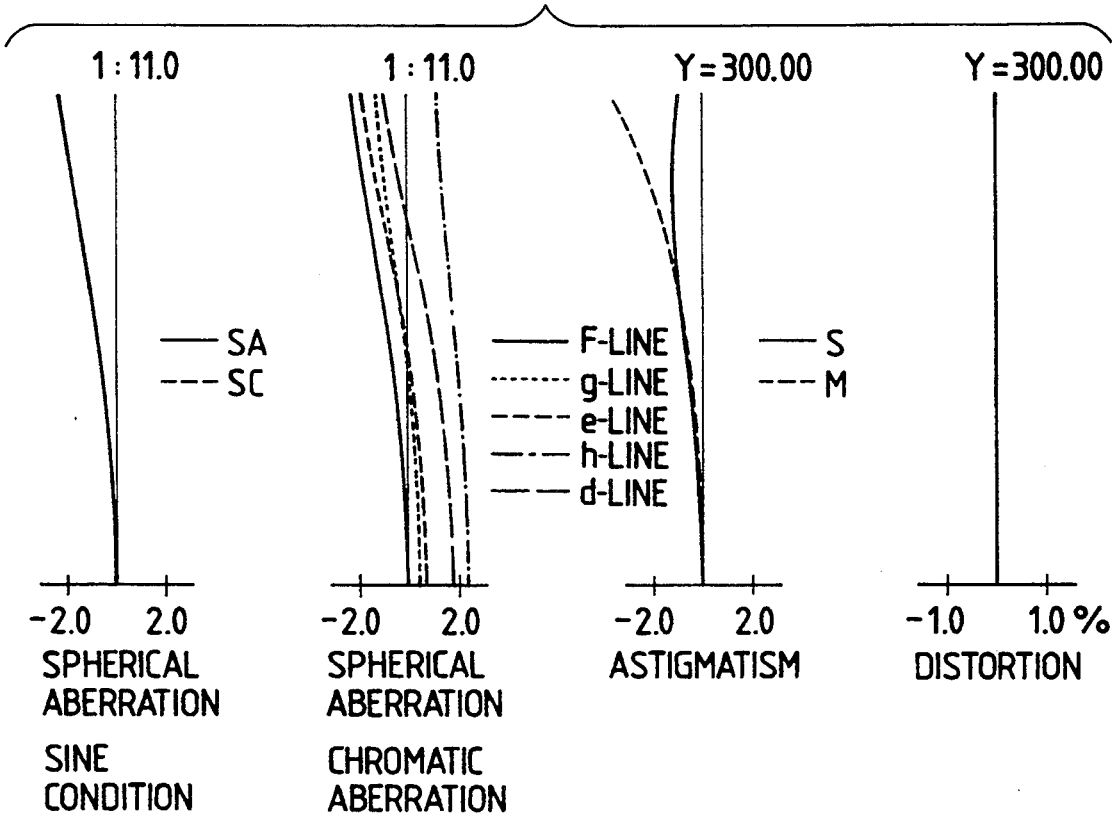
FIG. 12 is a set of graphs plotting the aberration curves obtained with the projection lens system of Example 6.

FIG. 11 is a simplified cross-sectional view showing a projection lens system according to Example 6 of the present invention. Specific data for this example are shown in Table 6. FIG. 12 is a set of graphs plotting the aberration curves obtained with the projection lens system of Example 6.

TABLE 6 f = 599.04   m = −1.00   fB = 1134.17   FNo. 1:11

| Surface No. | r | d | nF | ν | ng | nC | nd |
|---|---|---|---|---|---|---|---|
| 1 | 200.658 | 8.50 | 1.73689 | 37.9 | 1.74801 | 1.71783 | 1.72342 |
| 2 | 300.011 | 0.50 | | | | | |
| 3 | 105.634 | 13.00 | 1.62757 | 60.3 | 1.63316 | 1.61728 | 1.62041 |
| 4 | 4512.049 | 2.92 | | | | | |
| 5 | 2332.373 | 7.00 | 1.62310 | 44.2 | 1.63089 | 1.60924 | 1.61340 |
| 6 | 87.569 | 59.92 | | | | | |

TABLE 6-continued f = 599.04   m = −1.00   fB = 1134.17   FNo. 1:11

| Surface No. | r | d | nF | ν | ng | nC | nd |
|---|---|---|---|---|---|---|---|
| 7 | −87.569 | 7.00 | 1.62310 | 44.2 | 1.63089 | 1.60924 | 1.61340 |
| 8 | −2332.373 | 2.92 | | | | | |
| 9 | −4512.049 | 13.00 | 1.62757 | 60.3 | 1.63316 | 1.61728 | 1.62041 |
| 10 | −105.634 | 0.50 | | | | | |
| 11 | −300.011 | 8.50 | 1.73689 | 37.9 | 1.74801 | 1.71783 | 1.72342 |
| 12 | −200.658 | | | | | | |

EXAMPLE 7

FIG. 13 is a simplified cross-sectional view showing a projection lens system according to Example 7 of the present invention. Specific data for this example are shown in Table 7. FIG. 14 is a set of graphs plotting the aberration curves obtained with the projection lens system of Example 7.

TABLE 7 f = 599.04   m = −1.00   fB = 1127.68   FNo. 1:11

| Surface No. | r | d | nF | ν | ng | nC | nd |
|---|---|---|---|---|---|---|---|
| 1 | 232.573 | 8.50 | 1.79831 | 36.1 | 1.81103 | 1.77665 | 1.78300 |
| 2 | 345.456 | 0.50 | | | | | |
| 3 | 100.536 | 13.00 | 1.62757 | 60.3 | 1.63316 | 1.61728 | 1.62041 |
| 4 | 1872.935 | 2.02 | | | | | |
| 5 | 1519.569 | 7.00 | 1.62310 | 44.2 | 1.63089 | 1.60924 | 1.61340 |
| 6 | 85.980 | 71.94 | | | | | |
| 7 | −85.980 | 7.00 | 1.62310 | 44.2 | 1.63089 | 1.60924 | 1.61340 |
| 8 | −1519.569 | 2.02 | | | | | |
| 9 | −1872.935 | 13.00 | 1.62757 | 60.3 | 1.63316 | 1.61728 | 1.62041 |
| 10 | −100.536 | 0.50 | | | | | |
| 11 | −345.456 | 8.50 | 1.79831 | 36.1 | 1.81103 | 1.77665 | 1.78300 |
| 12 | −232.573 | | | | | | |

EXAMPLE 8

Figure 16:
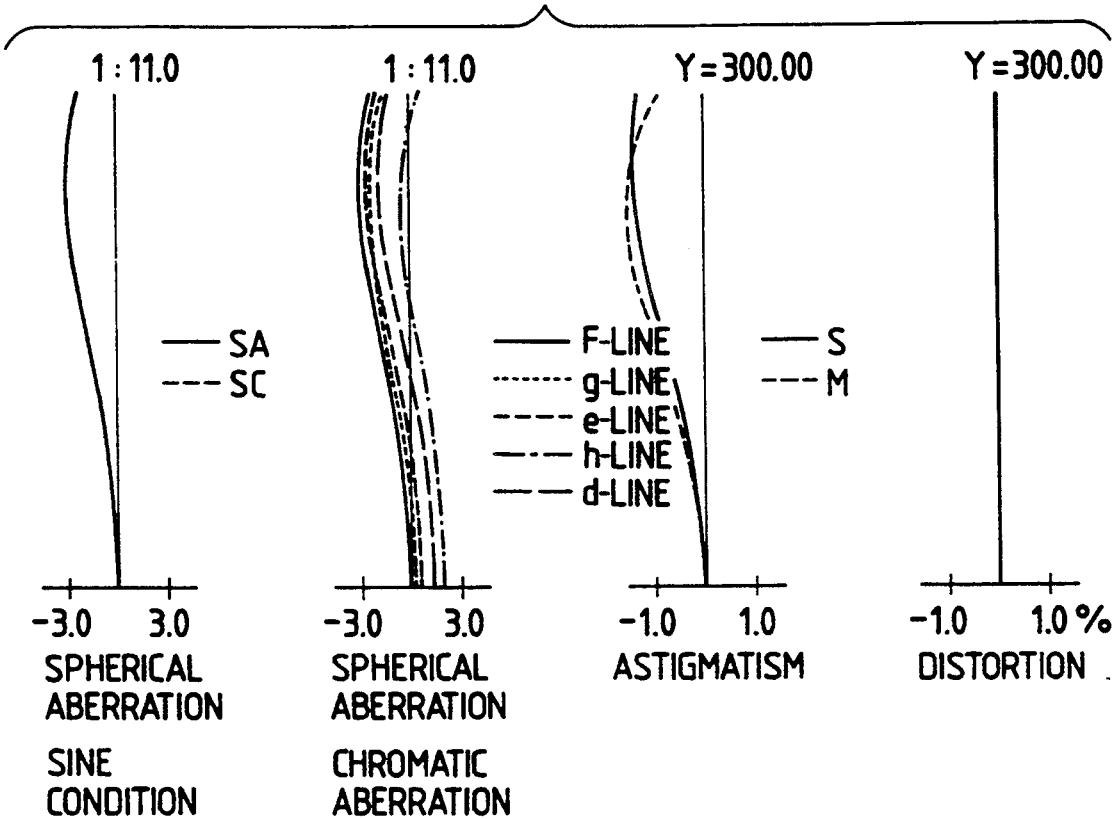
FIG. 16 is a set of graphs plotting the aberration curves obtained with the projection lens system of Example 8.

FIG. 15 is a simplified cross-sectional view showing a projection lens system according to Example 8 of the present invention. Specific data for this example are shown in Table 8. FIG. 15 also illustrates stop diaphragm 20 of the projection device. FIG. 16 is a set of graphs plotting the aberration curves obtained with the projection lens system of Example 8.

TABLE 8 f = 599.20   m = −1.00   fB = 1138.66   FNo. 1:11

| Surface No. | r | d | nF | ν | ng | nC | nd |
|---|---|---|---|---|---|---|---|
| 1 | 91.368 | 12.00 | 1.57464 | 71.3 | 1.57899 | 1.56666 | 1.56907 |
| 2 | 251.725 | 1.50 | | | | | |
| 3 | 193.485 | 8.00 | 1.53933 | 48.9 | 1.54541 | 1.52845 | 1.53172 |
| 4 | 73.228 | 10.80 | | | | | |
| 5 | 102.280 | 7.00 | 1.75566 | 44.8 | 1.76505 | 1.73905 | 1.74400 |
| 6 | 115.000 | 39.76 | | | | | |
| 7 | −115.000 | 7.00 | 1.75566 | 44.8 | 1.76505 | 1.73905 | 1.74400 |
| 8 | −102.280 | 10.80 | | | | | |
| 9 | −73.228 | 8.00 | 1.53933 | 48.9 | 1.54541 | 1.52845 | 1.53172 |
| 10 | −193.485 | 1.50 | | | | | |
| 11 | −251.725 | 12.00 | 1.57464 | 71.3 | 1.57899 | 1.56666 | 1.56907 |
| 12 | −91.368 | | | | | | |

EXAMPLE 9

Figure 17:
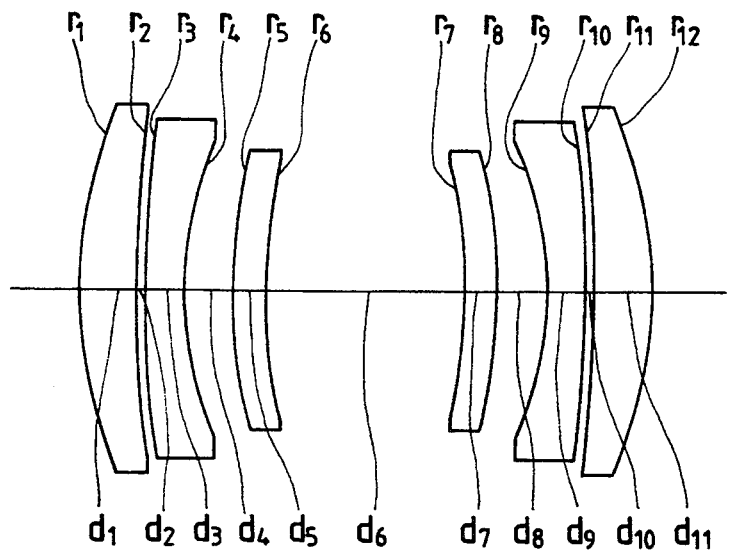
FIG. 17 is a simplified cross-sectional view showing the projection lens system of Example 9.
Figure 18:
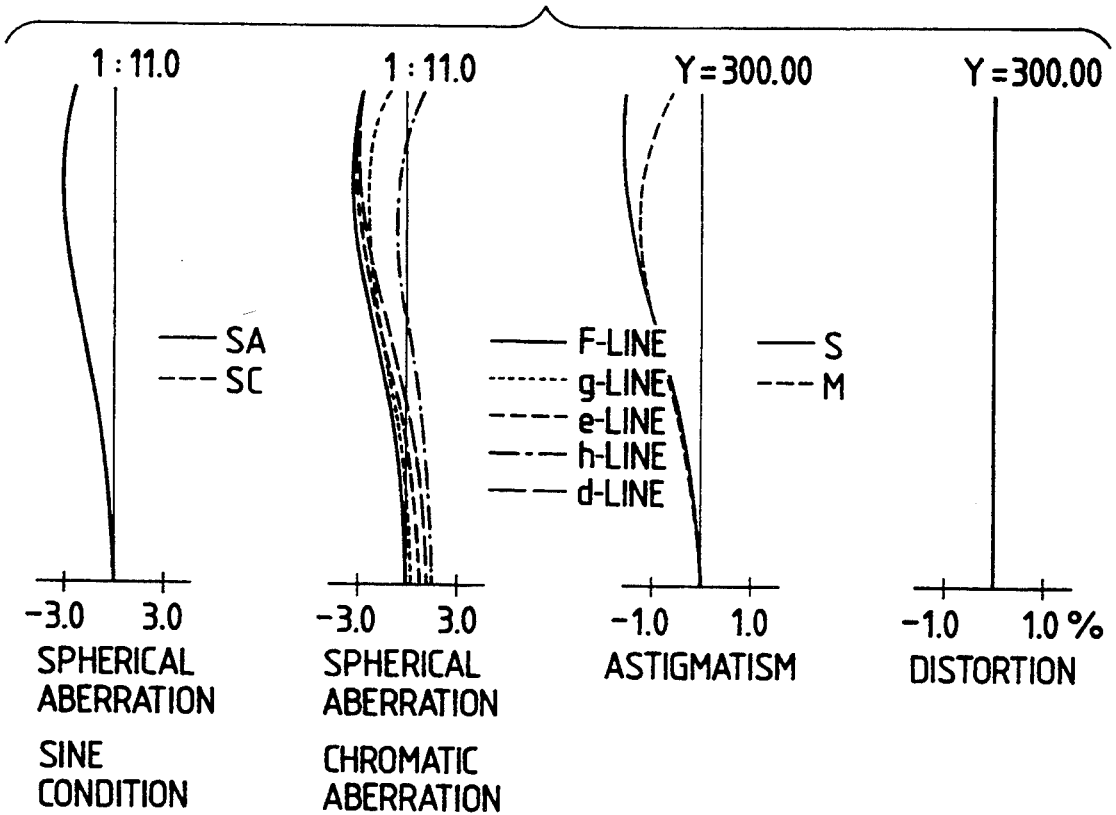
FIG. 18 is a set of graphs plotting the aberration curves obtained with the projection lens system of Example 9.

FIG. 17 is a simplified cross-sectional view showing a projection lens system according to Example 9 of the present invention. Specific data for this example are shown in Table 9. FIG. 18 is a set of graphs plotting the aberration curves obtained with the projection lens system of Example 9.

TABLE 9 f = 598.98  m = −1.00  fB = 1139.11  FNo. 1:11

| Surface No. | r | d | nF | ν | ng | nC | nd |
|---|---|---|---|---|---|---|---|
| 1 | 91.479 | 12.00 | 1.57464 | 71.3 | 1.57899 | 1.56666 | 1.56907 |
| 2 | 283.153 | 1.50 | | | | | |
| 3 | 233.901 | 8.00 | 1.55654 | 45.8 | 1.56331 | 1.54457 | 1.54814 |
| 4 | 74.955 | 10.00 | | | | | |
| 5 | 109.830 | 7.00 | 1.81719 | 35.0 | 1.83061 | 1.79428 | 1.80100 |
| 6 | 128.083 | 40.80 | | | | | |
| 7 | −128.083 | 7.00 | 1.81719 | 35.0 | 1.83061 | 1.79428 | 1.80100 |
| 8 | −109.830 | 10.00 | | | | | |
| 9 | −74.955 | 8.00 | 1.55654 | 45.8 | 1.56331 | 1.54457 | 1.54814 |
| 10 | −233.901 | 1.50 | | | | | |
| 11 | −283.153 | 12.00 | 1.57464 | 71.3 | 1.57899 | 1.56666 | 1.56907 |
| 12 | −91.479 | | | | | | |

EXAMPLE 10

Figure 19:
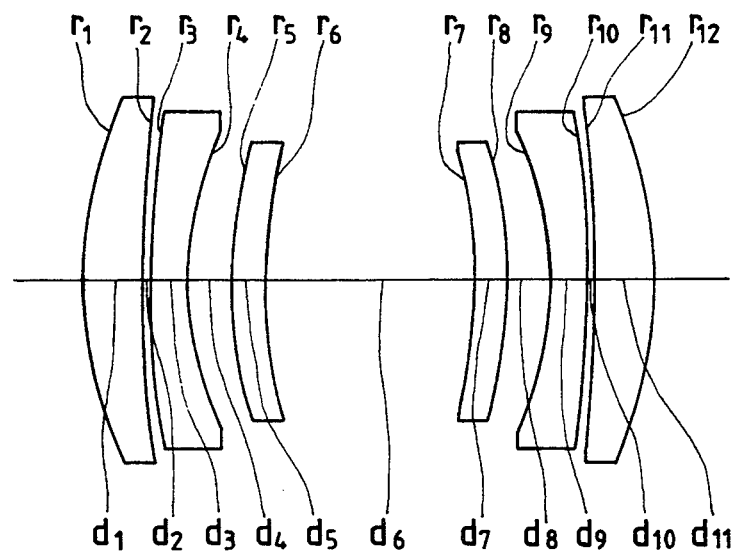
FIG. 19 is a simplified cross-sectional view showing the projection lens system of Example 10.
Figure 20:
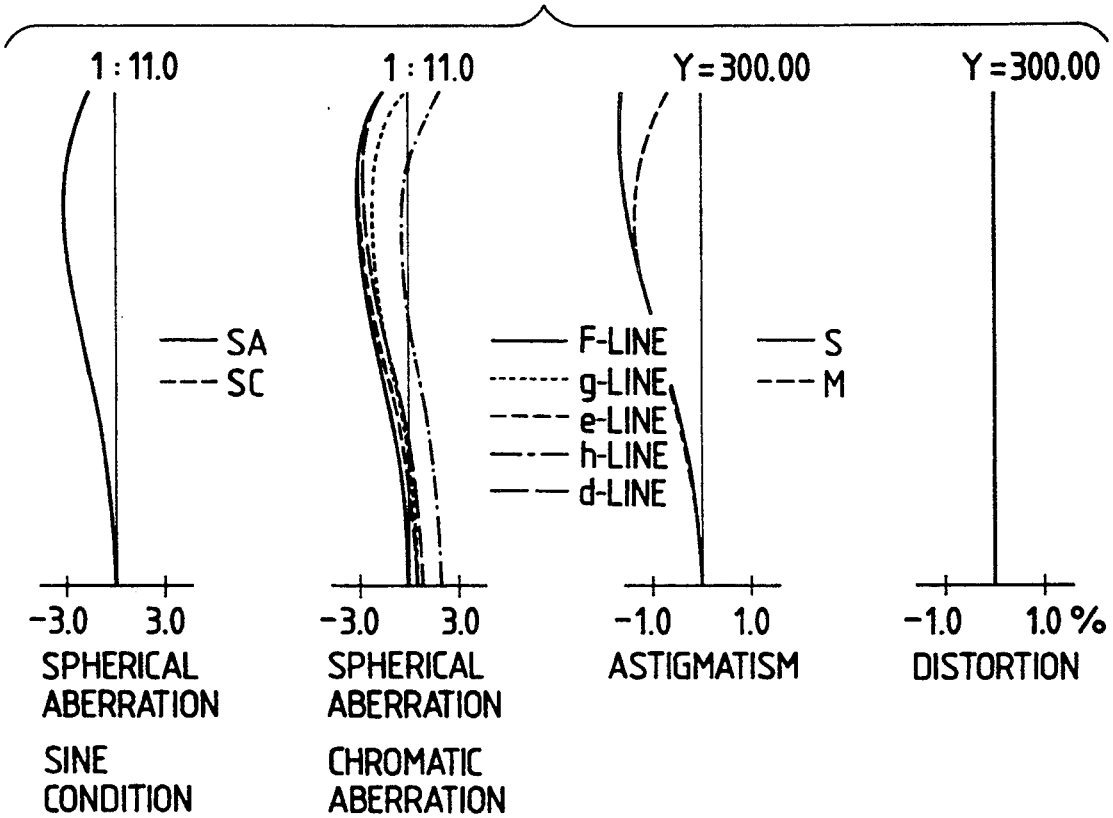
FIG. 20 is a set of graphs plotting the aberration curves obtained with the projection lens system of Example 10.

FIG. 19 is a simplified cross-sectional view showing a projection lens system according to Example 10 of the present invention. Specific data for this example are shown in Table 10. FIG. 20 is a set of graphs plotting the aberration curves obtained with the projection lens system of Example 10.

TABLE 10 f = 599.02  m = −1.00  fB = 1138.02  FNo. 1:11

| Surface No. | r | d | nF | ν | ng | nC | nd |
|---|---|---|---|---|---|---|---|
| 1 | 87.527 | 12.00 | 1.57464 | 71.3 | 1.57899 | 1.56666 | 1.56907 |
| 2 | 260.160 | 1.50 | | | | | |
| 3 | 189.174 | 8.00 | 1.57664 | 42.8 | 1.58421 | 1.56339 | 1.56732 |
| 4 | 69.686 | 8.90 | | | | | |
| 5 | 92.649 | 7.00 | 1.73462 | 29.5 | 1.74915 | 1.71032 | 1.71736 |
| 6 | 106.428 | 43.00 | | | | | |
| 7 | −106.428 | 7.00 | 1.73462 | 29.5 | 1.74915 | 1.71032 | 1.71736 |
| 8 | −92.649 | 8.90 | | | | | |
| 9 | −69.686 | 8.00 | 1.57664 | 42.8 | 1.58421 | 1.56339 | 1.56732 |
| 10 | −189.174 | 1.50 | | | | | |
| 11 | −260.160 | 12.00 | 1.57464 | 71.3 | 1.57899 | 1.56666 | 1.56907 |
| 12 | −87.527 | | | | | | |

EXAMPLE 11

Figure 21:
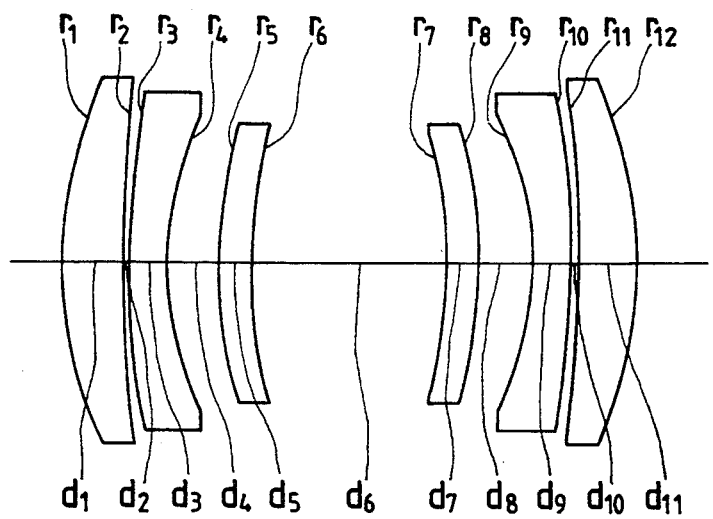
FIG. 21 is a simplified cross-sectional view showing the projection lens system of Example 11.
Figure 22:
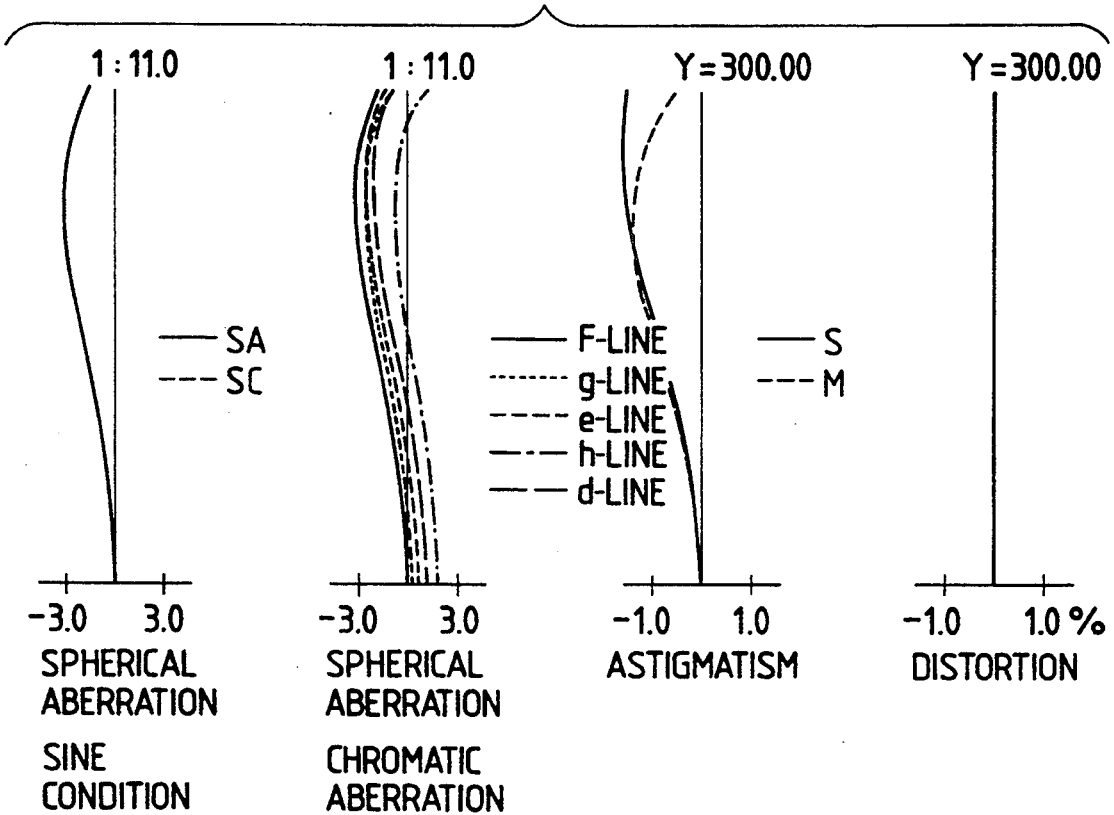
FIG. 22 is a set of graphs plotting the aberration curves obtained with the projection lens system of Example 11.

FIG. 21 is a simplified cross-sectional view showing a projection lens system according to Example 11 of the present invention. Specific data for this example are shown in Table 11. FIG. 22 is a set of graphs plotting the aberration curves obtained with the projection lens system of Example 11.

TABLE 11 f = 599.05  m = −1.00  fB = 1137.60  FNo. 1:11

| Surface No. | r | d | nF | ν | ng | nC | nd |
|---|---|---|---|---|---|---|---|
| 1 | 85.883 | 12.00 | 1.57464 | 71.3 | 1.57899 | 1.56666 | 1.56907 |
| 2 | 241.460 | 1.50 | | | | | |
| 3 | 177.182 | 8.00 | 1.55654 | 45.8 | 1.56331 | 1.54457 | 1.54814 |
| 4 | 68.116 | 10.60 | | | | | |
| 5 | 91.548 | 7.00 | 1.65293 | 34.5 | 1.66383 | 1.63437 | 1.63980 |
| 6 | 104.494 | 39.80 | | | | | |
| 7 | −104.494 | 7.00 | 1.65293 | 34.5 | 1.66383 | 1.63437 | 1.63980 |
| 8 | −91.548 | 10.60 | | | | | |
| 9 | −68.116 | 8.00 | 1.55654 | 45.8 | 1.56331 | 1.54457 | 1.54814 |
| 10 | −177.182 | 1.50 | | | | | |
| 11 | −241.460 | 12.00 | 1.57464 | 71.3 | 1.57899 | 1.56666 | 1.56907 |
| 12 | −85.883 | | | | | | |

Table 15 below shows how conditions (1) to (8) and (1A) to (8) discussed hereinabove are satisified in Examples 1 to 11.

| Condition | Ex. 1 | Ex. 2 | Ex. 3 | Ex. 4 | Ex. 5 | Ex. 6 | Ex. 7 |
|---|---|---|---|---|---|---|---|
| (1) | −0.00117 | −0.00117 | −0.00117 | −0.00099 | −0.00117 | −0.00117 | −0.00117 |
| (2) | 0.32 | 0.34 | 0.28 | 0.34 | 0.29 | 0.29 | 0.28 |
| (3) | −0.26 | −0.26 | −0.24 | −0.26 | −0.25 | −0.24 | −0.25 |
| (4) | 0.10 | 0.10 | 0.10 | 0.10 | 0.12 | 0.06 | 0.09 |
| (5) | 0.20 | 0.20 | 0.20 | 0.20 | 0.20 | 0.21 | 0.22 |
| (6) | 4.65 | 4.36 | 4.95 | 4.55 | 4.05 | 4.27 | 4.33 |
| (7) | 7.60 | 7.32 | 7.46 | 7.52 | 5.98 | 5.77 | 5.79 |
| (8) | 0.12 | 0.12 | 0.12 | 0.12 | 0.09 | 0.10 | 0.12 |

| Condition | Ex. 8 | Ex. 9 | Ex. 10 | Ex. 11 |
|---|---|---|---|---|
| (1A) | −0.00065 | −0.00080 | −0.00093 | −0.00080 |
| (2A) | 0.37 | 0.38 | 0.37 | 0.38 |
| (3A) | −0.34 | −0.34 | −0.33 | −0.34 |
| (4A) | 0.13 | 0.14 | 0.08 | 0.06 |
| (5) | 0.20 | 0.20 | 0.20 | 0.20 |
| (6A) | 4.41 | 4.49 | 4.96 | 4.89 |
| (7A) | 8.17 | 8.22 | 8.68 | 8.28 |
| (8A) | 0.07 | 0.07 | 0.07 | 0.07 |

The conditions expressed by prime, for example (1'), (2') . . . (1A'), (2A') . . . have the same calculated value as listed above.

The projection lens systems of the examples have an F number as large as 1:11 and depth of focus can be sufficiently increased to prevent the drop of image resolution even if the ambient temperature or the thickness of the object to be projected varies. Therefore, when using those lens systems as projection lens in a platemaker, the need for readjustments due to changes in the ambient temperature and other parameters is eliminated to reduce the load on platemaking operators.

As described on the foregoing pages, the projection lens system of the present invention causes a smaller amount of residual chromatic aberrations and, hence, is capable of producing a contrasty image even if it is used as a long-focus lens. In addition, by satisfying specified conditions, the lens system is capable of producing a flat image plane and a uniform image without any uneveness in density.

We claim:

1. A projection lens system comprising a front group and a rear group, said front group comprising, in order from an object side, a positive first lens element, a positive second lens element and a negative third lens element, said rear group comprising a negative fourth lens element, a positive fifth lens element and a positive sixth lens element, said lens system satisfying the following conditions:

$$-0.0015 < (\theta_2 - \theta_3)/(\nu_2 - \nu_3) < 0$$

$$-0.0015 < (\theta_5 - \theta_4)/(\nu_5 - \nu_4) < 0$$

where $\theta_2$ and $\nu_2$ denote the dispersion index of the second lens element, $\theta_3$ and $\nu_3$ denote the dispersion index of the third lens element, $\theta_4$ and $\nu_4$ denote the dispersion index of the fourth lens element and $\theta_5$ and $\nu_5$ denote the dispersion index of the fifth lens element and, with $\theta$ and $\nu$ being defined by:

$$\theta = (n_g - n_F)/(n_F - n_C)$$

$$\nu = (n_d - 1)/(n_F - n_C)$$

where ng, nF, nC and nd denote the refractive indices of a lens element at the g, F, C and d lines, respectively.

2. A projection lens system according to claim 1 which further satisfies the following conditions:

$$0.25 < f_2/f < 0.40$$

$$0.25 < f_5/f < 0.40$$

$$-0.30 < f_3/f < -0.20$$

$$-0.30 < f_4/f < -0.20$$

$$0.03 < (n_{F1} + n_{F2})/2 - n_{F3}$$

$$0.03 < (n_{F6} + n_{F5})/2 - n_{F4}$$

$$0.15 < L/f < 0.25$$

where f denotes the focal length of the overall system, fi the focal length of the ith lens element, nFi the refractive index of the ith lens element at the F-line, and L the overall lens length.

3. A projection lens system according to claim 2 further satisfies the following conditions:

$$3.5 < f \cdot \{(n_{F3} - 1)/r_6\} < 5.5$$

$$3.5 < f \cdot \{(n_{F4} - 1)/r_7\} < 5.5$$

$$5.0 < f \cdot \{(n_{F1} - 1)/r_1 + (n_{F2} - 1)/r_3\} < 10.0$$

$$5.0 < f \cdot \{(n_{F6} - 1)/r_{12} + (n_{F5} - 1)/r_{10}\} < 10.0$$

$$0.07 < d_6/f < 0.15$$

where ri denotes the radius of curvature of the ith surface as counted from the object side, and d6 a distance between the front and rear groups.

4. A projection lens system comprising a front group and a rear group, said front group comprising, in order from the object side, a positive first lens element, a negative second lens element and a positive third lens element, said rear group comprising a positive fourth lens element, a negative lens element and a positive sixth lens element, said lens system satisfying the following conditions:

$$-0.0012 < (\theta_1 - \theta_2)/\nu_1 - 2\nu_2) < 0$$

$$-0.0012 < (\theta_6 - \theta_5)/\nu_6 - \nu_5) < 0$$

where $\theta_1$ and $\nu_1$ denote the dispersion index of the first lens element, $\theta_2$ and $\nu_2$ denote the dispersion index of the second lens element, $\theta_5$ and $\nu_5$ denote the dispersion index of the fifth lens element and $\theta_6$ and $\nu_6$ denote the dispersion index of the sixth lens element and, with $\theta$ and $\nu$ being defined by:

$$\theta = (n_g - n_F)/(n_F - n_C)$$

$$\nu = (n_d - 1)/(n_F - n_C)$$

where ng, nF, nC and nd denote the refractive indices of a lens element at the g, F, C and d lines respectively.

5. A projection lens system according to claim 4 which further satisfies the following conditions:

$$0.25 < f_1/f < 0.40$$

$$0.25 < f_6/f < 0.40$$

$$-0.40 < f_2/f < -0.30$$

$$-0.40 < f_5/f < -0.30$$

$$0.04 < (n_{F1} + n_{F3})/2 - n_{F2}$$

$$0.04 < (n_{F6} + n_{F4})/2 - n_{F5}$$

$$0.15 < L/f < 0.25$$

where f denotes the focal length of the overall system, fi the focal length of the ith lens element, nFi the refractive index of the ith lens element at the F-line, and L the overall lens length.

6. A projection lens system according to claim 5 further satisfies the following conditions:

$$3.5 < f \cdot \{(n_{F2} - 1)/r_4\} < 5.5$$

$$3.5 < |f \cdot \{(n_{F5} - 1)/r_9\}| < 5.5$$

$$7.0 < f \cdot \{(n_{F1} - 1)/r_1 + (n_{F3} - 1)/r_5\} < 10.0$$

$$7.0 < |f \cdot \{(n_{F6} - 1)/r_{12} + (n_{F4} - 1)/r_8\}| < 10.0$$

$$0.05 < d_6/f < 0.09$$

where ri denotes the radius of curvature of the ith surface as counted from the object side, and d6 a distance between the front and rear groups.

* * * * *